(12) United States Patent
Chen et al.

(10) Patent No.: US 9,608,723 B2
(45) Date of Patent: Mar. 28, 2017

(54) CARRIER-SIGNAL POWER RATIO CONTROL IN DIRECT DETECTION OPTICAL SYSTEMS

(71) Applicant: Huawei Technologies Co., Ltd., Shenzhen (CN)

(72) Inventors: Chen Chen, Ottawa (CA); Chuandong Li, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 14/518,881

(22) Filed: Oct. 20, 2014

(65) Prior Publication Data

US 2016/0112123 A1    Apr. 21, 2016

(51) Int. Cl.
*H04B 10/079* (2013.01)
*H04B 10/572* (2013.01)
*H04J 14/02* (2006.01)

(52) U.S. Cl.
CPC ... *H04B 10/07955* (2013.01); *H04B 10/0799* (2013.01); *H04B 10/572* (2013.01); *H04J 14/0227* (2013.01)

(58) Field of Classification Search
CPC .................................................. H04B 10/572
See application file for complete search history.

(56) References Cited

U.S. PATENT DOCUMENTS

| 8,233,799 B2 | 7/2012 | Lowery |
| 2003/0058509 A1* | 3/2003 | Webb ............... H04B 10/503 398/197 |
| 2011/0085794 A1 | 4/2011 | Lei et al. |

(Continued)

FOREIGN PATENT DOCUMENTS

| CN | 102142902 A | 8/2011 |
| CN | 103414680 A | 11/2013 |
| CN | 103475417 A | 12/2013 |

OTHER PUBLICATIONS

Tiago M. F. Alves, Adolfo V. T. Cartaxo, "Semi-analytical approach for performance evaluation of direct-detection OFDM optical communication systems," Opt. Express 17, 18714-18729 (2009).*

(Continued)

*Primary Examiner* — Nathan Curs
(74) *Attorney, Agent, or Firm* — Slater Matsil, LLP

(57) ABSTRACT

System and method embodiments are provided for carrier-signal power ratio (CSPR) control in direct detection optical systems. In an embodiment, a method for CSPR control in a direct detection optical system includes receiving an electrical signal in a receiver (RX) digital signal processor (DSP), wherein the electrical signal is obtained from a corresponding optical signal via a direct detection component; estimating, a CSPR for the electrical signal; generating one of a control signal according to the CSPR; and transmitting the control signal to one of an optical filter and a laser, wherein the wavelength control signal controls causes a center wavelength (CW) of one of the optical filter and the laser to be adjusted such that an offset between the CW of the laser and the CW of the optical filter results in a desired CSPR.

28 Claims, 14 Drawing Sheets

(56) References Cited

U.S. PATENT DOCUMENTS

2011/0200334 A1* 8/2011 Wu .................... H04J 14/0221
398/79
2014/0233013 A1 8/2014 Sakimura et al.

OTHER PUBLICATIONS

W. R. Peng, B. Zhang, K. M. Feng, X. Wu, A. E. Willner and S. Chi, "Spectrally Efficient Direct-Detected OFDM Transmission Incorporating a Tunable Frequency Gap and an Iterative Detection Techniques," in Journal of Lightwave Technology, vol. 27, No. 24, pp. 5723-5735, Dec. 15, 2009. doi: 10.1109/JLT.2009.2033304.*

* cited by examiner

CARRIER-SIGNAL POWER RATIO CONTROL IN DIRECT DETECTION OPTICAL SYSTEMS

TECHNICAL FIELD

The present invention relates to an optical transmission system, and, in particular embodiments, to a system and method for carrier-signal power ratio control direct detect optical systems.

BACKGROUND

It is well known that carrier-signal power ratio (CSPR) is a key parameter in direct detection Orthogonal Frequency-Division Multiplexing (OFDM) systems. FIG. 1 shows a graph 100 of a typical relationship between system Bit Error Rate (BER) and CSPR. When CSPR is small, BER is suboptimal because Subcarrier-Signal Beat Interference (SSBI) power is increased relative to signal power. Whereas when CSPR is large, BER is also suboptimal because system noise (usually measured by Optical Signal-to-Noise Ratio (OSNR)) dominates. The sweet spot for CSPR varies with system noise.

For an intensity optical modulator, an optimal CSPR can be set with an optical filter. However, due to laser wavelength wandering, the relative frequency offset between laser wavelength and optical filter center wavelength varies slowly in time, which results in undesirable variation in CSPR and error performance of the system. Therefore, it is desirable to closely monitor and actively control the CSPR.

SUMMARY

In accordance with an embodiment, a method for carrier-signal power ratio (CSPR) control in an direct detection optical system includes receiving an electrical signal in a receiver (RX) digital signal processor (DSP) wherein the electrical signal is obtained from a corresponding optical signal via a direct detection component; estimating, with the RX DSP, a CSPR for the electrical signal; generating, with the RX DSP, a control signal according to the CSPR; and transmitting, with the RX DSP, the control signal to one of an optical filter and a laser, wherein the control signal causes a center wavelength (CW) of one of the optical filter and the laser to be adjusted such that an offset between the CW of the optical filter and the CW of the laser results in a desired CSPR.

In accordance with an embodiment, a network component configured for carrier-signal power ratio (CSPR) control in a direct detection optical system includes a processor and a computer readable storage medium storing programming for execution by the processor, the programming including instructions to: receive an electrical signal, wherein the electrical signal is obtained from a corresponding optical signal via a direct detection component; estimate a CSPR for the electrical signal; generate a control signal according to the CSPR; and transmit the control signal to one of an optical filter and a laser, wherein the control signal causes a center wavelength (CW) of one of the optical filter and the laser to be adjusted such that an offset between the CW of the optical filter and the CW of the laser results in a desired CSPR.

In accordance with an embodiment, a direct detected optical transmission system includes a laser; an optical filter in a signal path of an optical output from the laser; and a processor communicably coupled to at least one of the laser and the optical filter, wherein the processor is configured to estimate a carrier-signal power ratio (CSPR) in the direct detected optical transmission system, wherein the processor is further configured to generate a control signal according to the CSPR, wherein the processor is further configured to send the control signal to one of the laser and the optical filter, and wherein the control signal causes a center wavelength (CW) of one of the optical filter and the laser to be adjusted such that an offset between the CW of the optical filter and the CW of the laser results in a desired CSPR in a transmitted optical signal.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
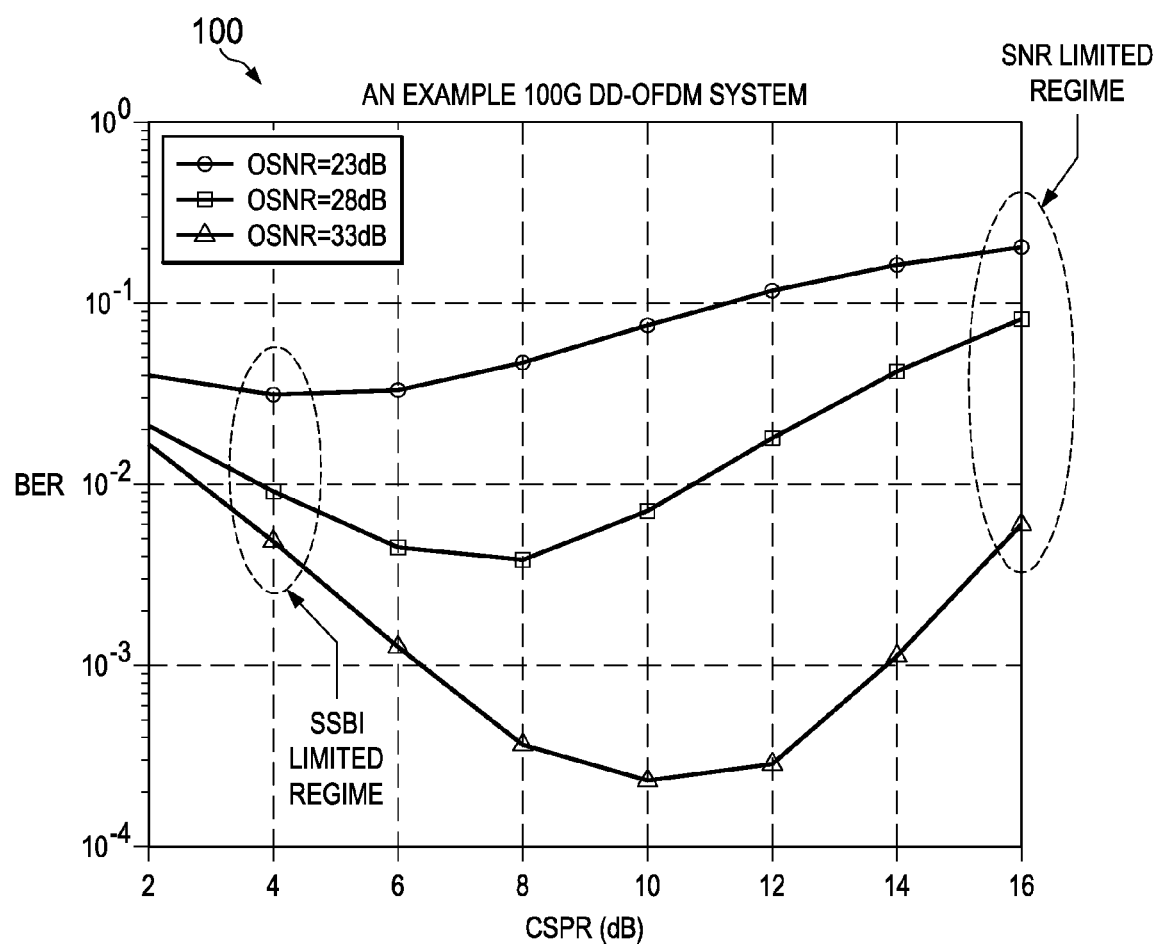
FIG. 1 is a graph that shows a typical relationship between system BER and CSPR.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In embodiments, a substantially optimal or improved carrier-signal power ration (CSPR) is useful to optimize transmission capacity and/or error performance of an optical transmission system using a direct detection receiver. Disclosed herein is a method to estimate and control CSPR that can be implemented on various platforms including on a Digital Signal Processor (DSP). In an embodiment, this method can be readily used in either single channel or Wavelength Division Multiplexing (WDM) transmission without requiring additional Electro-Optical (EO) hardware to the system, thereby resulting in hardware and cost efficiency. In an embodiment, the CSPR is used to control the center wavelength (CW) of the transmitter laser to substantially match an optical filter. In an embodiment, the CSPR is used to control the CW of an optical filter to substantially match that of a transmission laser. Embodiments of the disclosed systems and methods improve transmission capacity and/or error performance of direct detection optical systems. Embodiments of the disclosed systems and methods provide a more hardware efficient and less costly solution for improved transmission capacity and/or error performance in direct detection optical systems than other solutions. Embodiments of the disclosed systems and methods can be applied to either single channel or WDM transmission without adding new EO hardware to the system, thereby resulting in hardware and cost efficiency. In embodiments, the benefit of using the disclosed systems and methods is greater as the number of WDM channels increases. Although embodiments of the disclosure are described with reference to an OFDM signal, embodiment methods can be readily extended to other digitally generated optical signals.

Other solutions rely upon comparing the difference in optical power and field before and after the optical filter. However, this solution requires additional optical hardware (e.g., a photodetector) which will increase costs.

Disclosed herein are systems, methods, and apparatuses for laser and/or optical filter wavelength control In an embodiment, a receiver (RX) DSP can estimate CSPR, and send a control signal back to the transmitter (TX) for laser or filter wavelength control. In an embodiment, no additional optical hardware is needed.

In an embodiment, a method for carrier-signal power ratio (CSPR) control in a direct detection optical system includes receiving an electrical signal in a receiver (RX) digital signal processor (DSP) wherein the electrical signal is obtained from a corresponding optical signal via a direct detection component; estimating, with the RX DSP, a CSPR for the electrical signal; generating, with the RX DSP, a control signal according to the CSPR; and transmitting, with the RX DSP, the control signal to one of an optical filter and a laser, wherein the control signal causes a center wavelength (CW) of one of the optical filter and the laser to be adjusted such that an offset between the CW of the optical filter and the CW of the laser results in a desired CSPR. In an embodiment, the data traffic through the system is uninterrupted. In an embodiment, estimating the CSPR includes determining a ratio of signal power and a signal due to signal-signal beat interference (SSBI). In an embodiment, estimating the CSPR includes estimating the CSPR in a digital domain according to digital samples in a quadrature amplitude modulation (QAM) demodulator. In an embodiment, generating the control signal comprises averaging the estimated CSPR across multiple WDM channels and converting the average estimated CSPR into a single tuning voltage for a single-side band (SSB) filter.

In an embodiment, a direct detected optical transmission system includes a laser; an optical filter in a signal path of an optical output from the laser; and a processor communicably coupled to at least one of the laser and the optical filter, wherein the processor is configured to estimate a carrier-signal power ratio (CSPR) in the direct detected optical transmission system, wherein the processor is further configured to generate a control signal according to the CSPR, wherein the processor is further configured to send the control signal to one of the laser and the optical filter, and wherein the control signal causes a center wavelength (CW) of one of the optical filter and the laser to be adjusted such that an offset between the CW of the optical filter and the CW of the laser results in a desired CSPR in a transmitted optical signal. In an embodiment, generating the control signal includes generating a first control signal and a second control signal, and wherein sending the control signal includes transmitting the first control signal to a first optical element (i.e., the laser or the optical filter) and transmitting the second control signal to a second optical element (i.e., the other one of the laser and the optical filter), wherein the first control signal causes the CW of the first optical element to be adjusted and the second control signal causes the CW of the second optical element to be adjusted such that an offset between the CW of the first optical element and the CW of a second optical element results in a desired CSPR.

Figure 2:
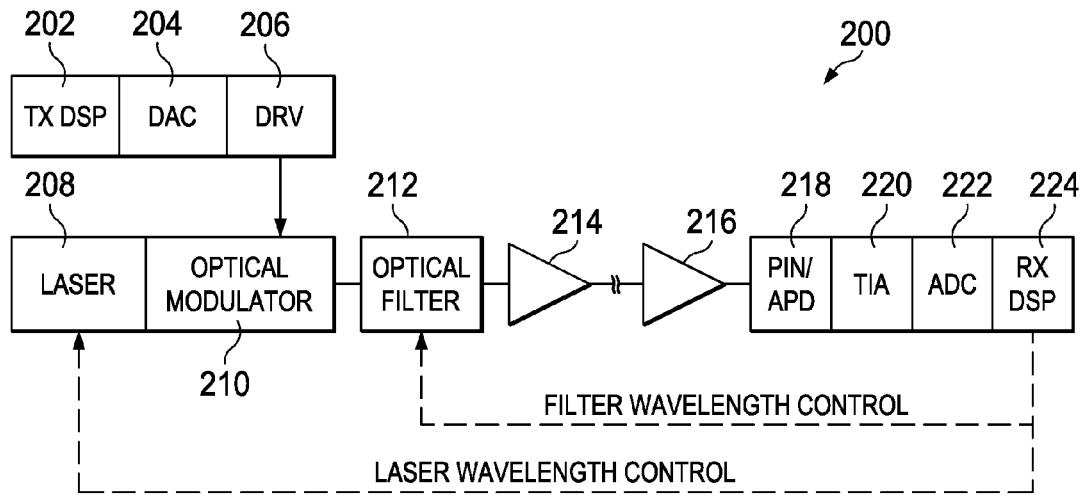
FIG. 2 is a diagram of an embodiment direct detection optical system using intensity optical modulator and optical filter.

FIG. 2 is a diagram of an embodiment direct detection optical system 200 using an intensity optical modulator and an optical filter. System 200 includes a transmitter (TX) digital signal processor (DSP) 202, a digital to analog converter (DAC) 204, a modulator driver (DRV) 206, a laser 208, an optical modulator 210, an optical filter 212, a TX amplifier 214, a receiver (RX) amplifier 216, a photo detector (PIN/APD) 218, a transimpedance amplifier (TIA) 220, an analog-to-digital convertor (ADC) 222, and a RX DSP 224. The components of system 200 may be arranged as shown in FIG. 2. In an embodiment, the photo detector 218 is a p-type, intrinsic, n-type diode (PIN) or an avalanche photodiode (APD).

The laser 208 generates and outputs continuous light to the optical modulator 210. In an embodiment, the laser 208 is a laser diode (LD). In other embodiments, other optical sources may be utilized rather than laser 208. The optical modulator 210 modulates the input light based on a drive signal output from the DRV 206. In an embodiment, the optical modulator 210 is an intensity optical modulator. In an embodiment, the drive signal is superimposed over a pilot signal. In an embodiment, the drive signal is an OFDM signal. However, in other embodiments, other optical drive signals may be utilized. The drive signal is determined by the TX DSP 202 and converted from a digital signal into an analog signal by the DAC 204. The output from the optical modulator 210 is provided to the optical filter 212 which filters the light output from the optical modulator 210 to pass only wavelengths of light associated with the pilot and drive signals. The filtered light is amplified by optical amplifiers 214, 216 and detected and converted into an electrical signal by PIN/APD 218. The converted electrical signal is amplified by TIA 220 and converted into a digital signal by ADC 222. The RX DSP 224 analyzes the detected signal and estimates a CSPR. Based on the estimated CSPR, the RX DSP 224 generates a control signal and transmits the control signal to either the laser 208 or the optical filter 212. In an embodiment, for the laser 208, the control signal is combined with the dc bias current or the voltage for the laser 208 to adjust CSPR. In an embodiment, for the optical filter 212, the control signal is combined with the drive voltage to adjust the center frequency of the optical filter 212. In other embodiments, other methods for transmitting the control signal to the laser 208 and/or the optical filter 212 may be utilized. The control signal causes either the laser 208 or the optical filter 212 to adjust its central wavelength (CW). By adjusting the relative frequency offset between the CW laser 208 wavelength and the CW of the optical filter 212, a desired CSPR can be achieved. In embodiments, optimal CSPR is critical to optimize transmission capacity and/or error performance of an optical transmission system using a direct detection receiver.

Figure 3:
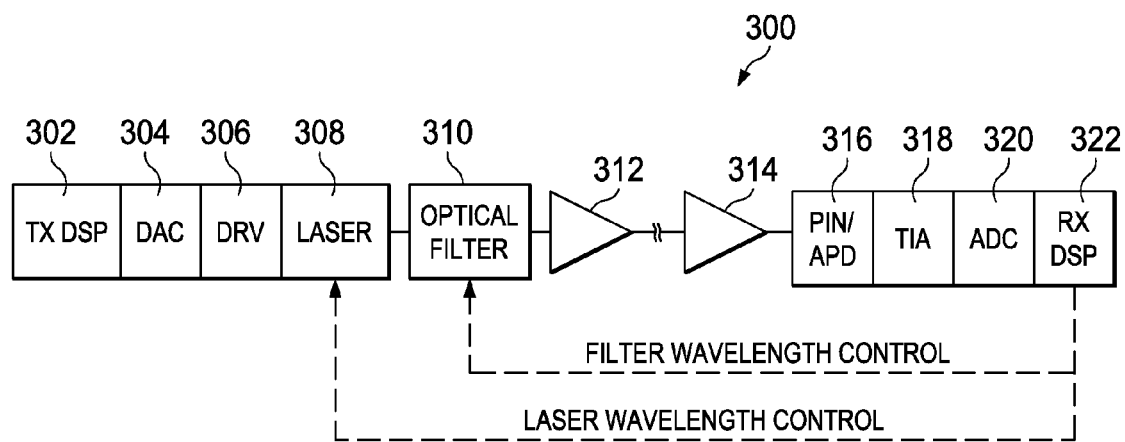
FIG. 3 is a diagram of an embodiment direct detection optical system using a directly modulated laser (DML) or an externally modulated laser (EML) and an optical filter.

FIG. 3 is a diagram of an embodiment direct detection optical system 300 using a directly modulated laser (DML) or an externally modulated laser (EML) and an optical filter. System 300 includes a TX DSP 302, a DAC 304, a DRV 306, a laser 308, an optical filter 310, a TX optical amplifier 312, a receiver optical amplifier 314, a photo detector (e.g., PIN/APD) 318, a TIA 318, an ADC 320, and an RX DSP 322. The components of system 300 may be arranged as shown in FIG. 3. System 300 operates in a similar manner to system 200 except that for the omission of an optical modulator since system 300 is a DML or EML system. The RX DSP 322 analyzes the detected signal and estimates a CSPR. Based on the estimated CSPR, the RX DSP 322 generates a control signal and transmits the control signal to either the laser 308 or the optical filter 310. The control signal causes either the laser 308 or the optical filter 310 to adjust its central wavelength (CW). By adjusting the relative frequency offset between the CW laser 308 wavelength and the CW of the optical filter 310, a desired CSPR can be achieved. In embodiments, optimal CSPR is critical to optimize transmission capacity and/or error performance of an optical transmission system using a direct detection receiver.

FIGS. 2 and 3 show two low-cost transceiver architectures for direct detection. In both cases a real-valued digitally-generated signal is converted into optical domain with intensity modulator such as a Mach-Zehnder (MZ) modulator, an electroabsorption modulator (EAM), a directly modulated laser (DML), and an externally modulated laser (EML). An optical filter can be used after optical modulator or laser to produce a single-side band (SSB) signal, so a system becomes more immune to chromatic dispersion (CD) from optical fiber transmission. In the meantime, a desired CSPR can be achieved by controlling the relative frequency offset between the center wavelength (CW) laser wavelength and the center wavelength of optical filter.

Figure 4:
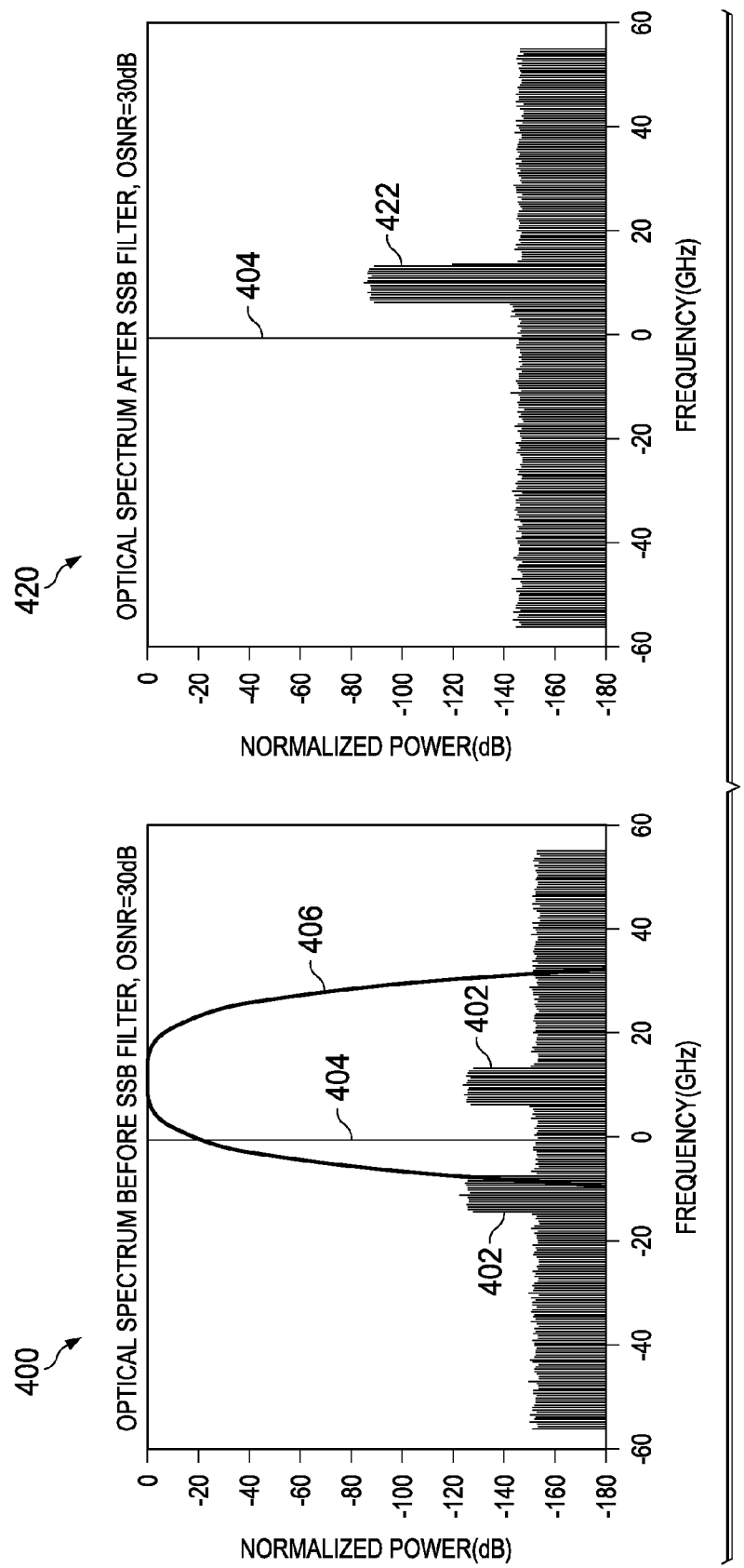
FIG. 4 shows an example optical spectrum before an optical filter an example optical spectrum after the optical filter.

FIG. 4 shows an example optical spectrum 400 before an optical filter an example optical spectrum 420 after the optical filter. Before the application of the optical filter 406, the optical spectrum includes two drive signals 402 and a pilot signal 404. After the optical filter, the optical spectrum includes one drive signal 422 that has increased power.

Figure 5:
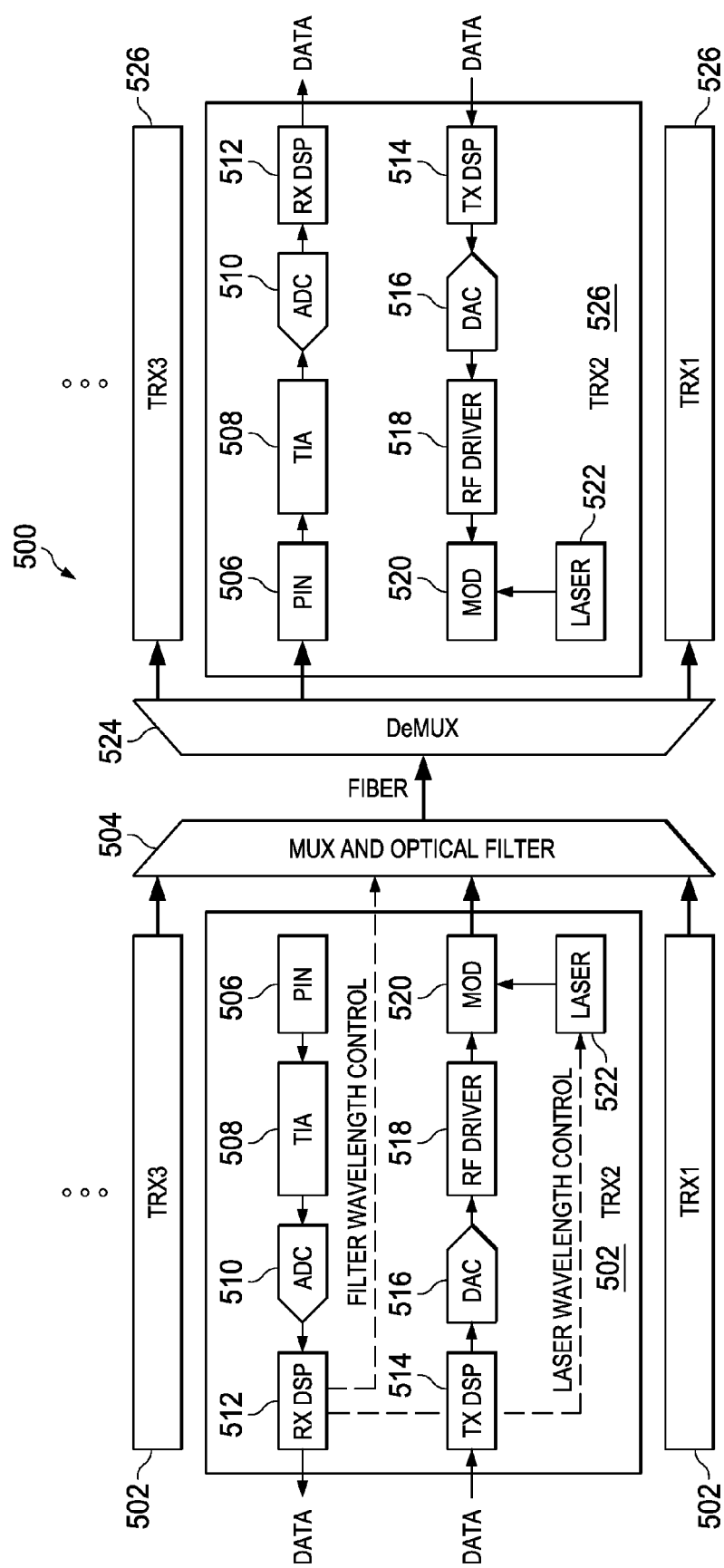
FIG. 5 is a schematic diagram of an embodiment WDM transceiver system using intensity optical modulator and optical filter.
Figure 6:
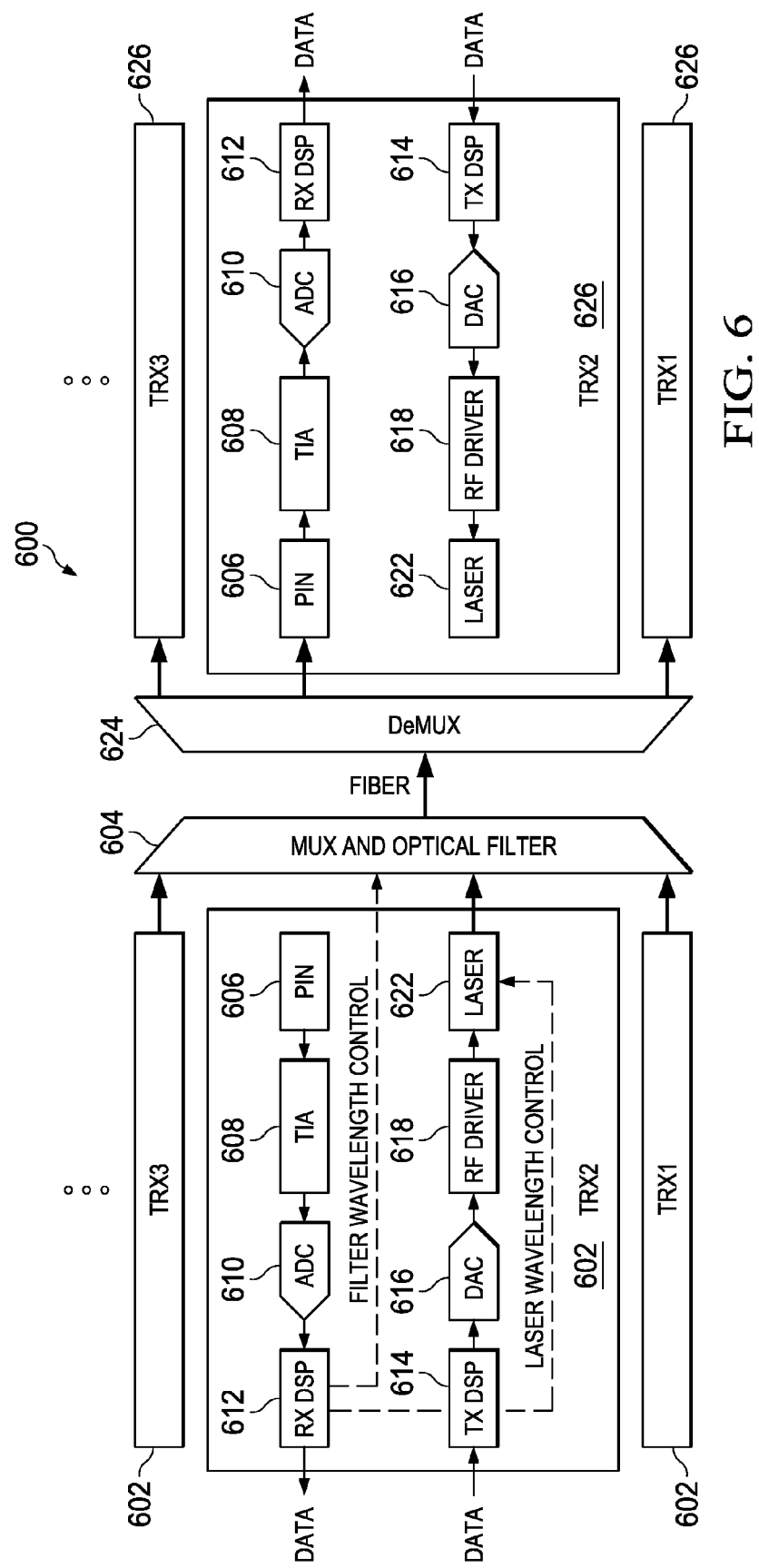
FIG. 6 is a schematic diagram of an embodiment WDM transceiver system using a directly modulated laser (DML) or an externally modulated laser (EML) and an optical filter.

Due to its periodic nature in wavelength, an SSB filter can be shared readily among WDM channels, to improve hardware and cost efficiency. FIGS. 5 and 6 depict the WDM transceiver architectures corresponding to those in FIGS. 2 and 3, respectively. RX can decode the feedback CSPR value embedded in the OFDM frame, and use that to control laser or optical filter wavelength. Each WDM channel can form individual control loop.

FIG. 5 is a schematic diagram of an embodiment WDM transceiver system 500 using intensity optical modulator and optical filter. System 500 includes a plurality of central office side transceivers 502 and a plurality of customer side transceivers 526. Each transceiver 502, 526 includes a PIN 506, a TIA 508, an ADC 510, a RX DSP 512, a TX DSP 514, a DAC 516, an RF driver 518, an optical modulator 520, and a laser 522. Output from each transceiver 502 is provided to a multiplex (MUX) and optical filter 504. The combined output from the MUX and optical filter 504 is received at an input to a Demultiplexer (DeMUX) 524 and the combined signals separated into a plurality of received optical signals with each one of the plurality of received optical signals directed to a corresponding one of the transceivers 526. The components of system 500 may be arranged as shown in FIG. 5.

The RX DSP 512 in each of the central office side transceivers 502 analyzes a detected signal and estimates a CSPR. Based on the estimated CSPR, the RX DSP 512 generates a control signal and transmits the control signal to either the laser 522 or the optical filter 504. The control signal causes either the laser 522 or the optical filter 504 to adjust its central wavelength (CW). By adjusting the relative frequency offset between the CW laser 522 wavelength and the CW of the optical filter 504, a desired CSPR can be achieved. In embodiments, optimal CSPR is critical to optimize transmission capacity and/or error performance of an optical transmission system using a direct detection receiver.

In one embodiment, the MUX+optical filter is realized exactly identical to the DeMUX. In this embodiment, the MUX+optical filter can be implemented in a single device and this device can also be used as a DeMux. The bi-directional links in this embodiment are completely identical. Therefore, the central office RX DSP can analyze the received signal to estimate the CSPR and apply this estimate directly to the central office side transmitter.

In another embodiment, the bi-directional links cannot be treated as identical. In this embodiment, a feedback channel (usually low speed) from the client back to the central office is utilized. The CSPR is estimated in the client side RX DSP and the estimated CSPR is sent back to the central office through the feedback channel. The central office RX then recovers the CSPR estimate and applies the CSPR estimate determined by the RX DSP to the central office transmitter.

FIG. 6 is a schematic diagram of an embodiment WDM transceiver system 600 using a directly modulated laser (DML) or an externally modulated laser (EML) and an optical filter. System 600 includes a plurality of central office side transceivers 602 and a plurality of customer side transceivers 626. Each transceiver 602, 626 includes a PIN 606, a TIA 608, an ADC 610, a RX DSP 612, a TX DSP 614, a DAC 616, an RF driver 618, and a laser 622. Output from each transceiver 602 is provided to a multiplex (MUX) and optical filter 604. The combined output from the MUX and optical filter 604 is received at an input to a Demultiplexer (DeMUX) 624 and the combined signals separated into a plurality of received optical signals with each one of the plurality of received optical signals directed to a corresponding one of the transceivers 626. The components of system 600 may be arranged as shown in FIG. 6.

The RX DSP 612 in each of the central office side transceivers 602 analyzes a detected signal and estimates a CSPR. Based on the estimated CSPR, the RX DSP 612 generates a control signal and transmits the control signal to either the laser 622 or the optical filter 604. The control signal causes either the laser 622 or the optical filter 604 to adjust its central wavelength (CW). By adjusting the relative frequency offset between the CW laser 622 wavelength and the CW of the optical filter 604, a desired CSPR can be achieved. In embodiments, optimal CSPR is critical to optimize transmission capacity and/or error performance of an optical transmission system using a direct detection receiver.

Figure 7:
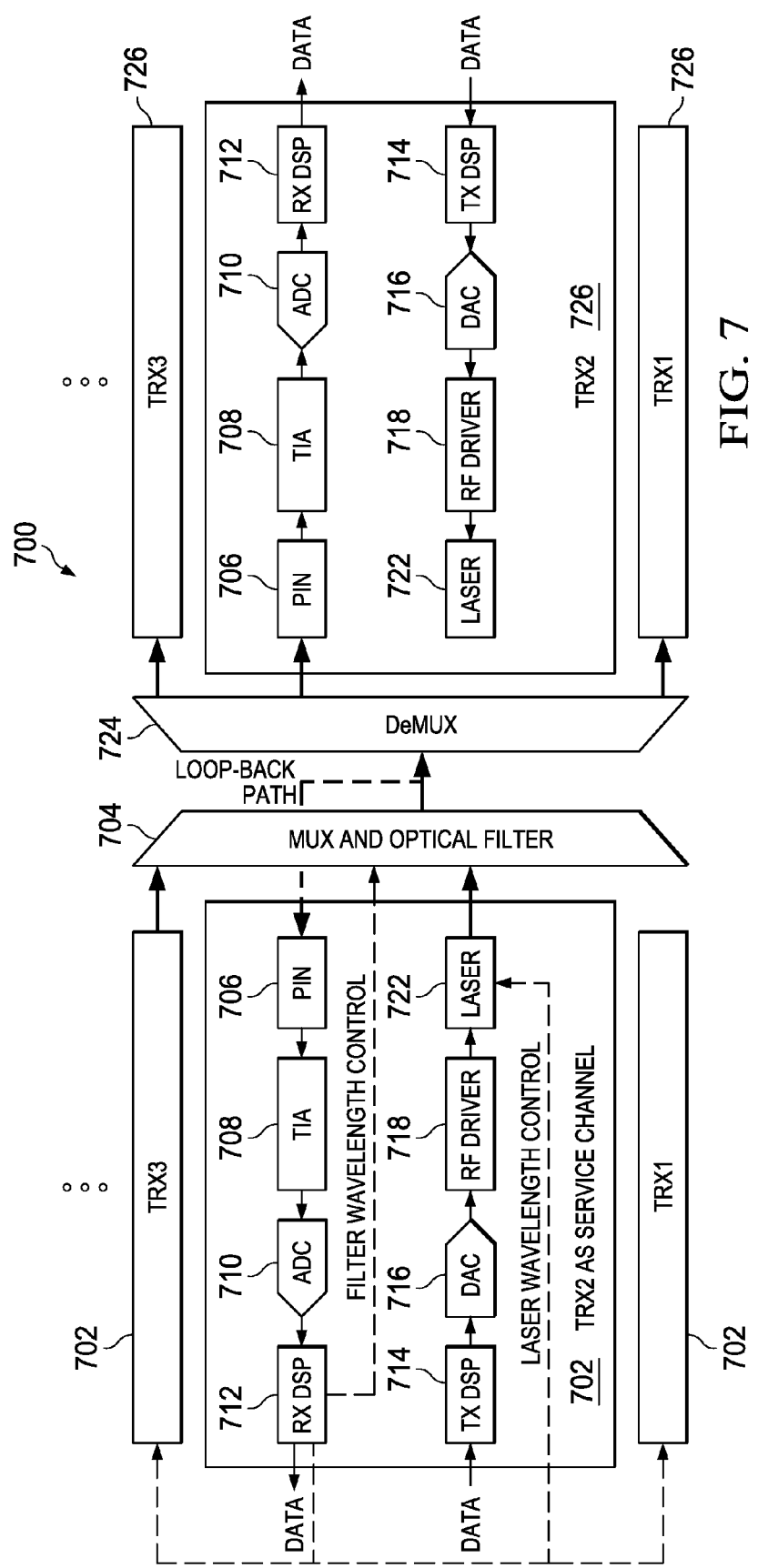
FIG. 7 is a schematic diagram of an embodiment WDM transceiver system using a directly modulated laser (DML) or an externally modulated laser (EML) and an optical filter.

FIG. 7 is a schematic diagram of an embodiment WDM transceiver system 700 using a directly modulated laser (DML) or an externally modulated laser (EML) and an optical filter. System 700 includes a plurality of central office side transceivers 702 and a plurality of customer side transceivers 726. Each transceiver 702, 726 includes a PIN 706, a TIA 708, an ADC 710, an RF driver 718, a RX DSP 712, a TX DSP 714, a DAC 716, an RF driver 718, and a laser 722. Output from each transceiver 702 is provided to a multiplex (MUX) and optical filter 704. The combined output from the MUX and optical filter 704 is received at an input to a Demultiplexer (DeMUX) 724 and the combined signals separated into a plurality of received optical signals with each one of the plurality of received optical signals directed to a corresponding one of the transceivers 726. The components of system 700 may be arranged as shown in FIG. 7.

FIG. 7 shows another possibility in which control loop can be formed using a service channel to reduce feedback delay. A part of the optical signal output from the MUX and optical filter 704 is separated and detected by PIN 702. This detected signal is used by RX DSP to estimate CSPR and generate control signals for the laser 722 or the optical filter 704. Also, in an embodiment, the RX DSP 712 in one of the central office side transceivers 702 controls the laser in all of the central office side transceivers 702.

Figure 8:
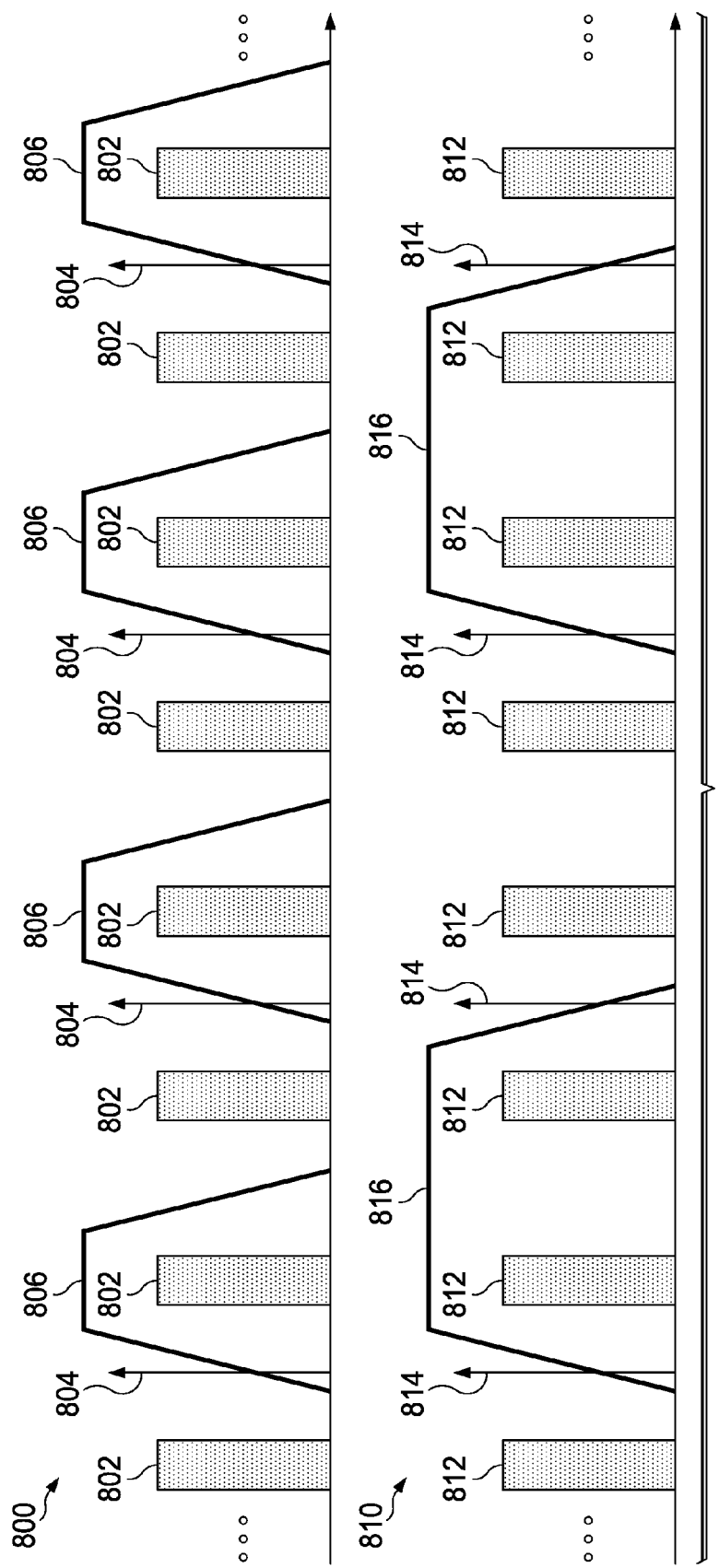
FIG. 8 shows two possible SSB arrangements relative to WDM channels.

FIG. 8 shows two possible SSB arrangements relative to WDM channels. One arrangement of WDM signals 802 includes a filter 806 for each channel immediately at a higher frequency than the pilot signal 804. In another arrangement of WDM signals 812, a filter 816 includes two WDM signals 812 between every other pair of two pilot signals 814.

Figure 9:
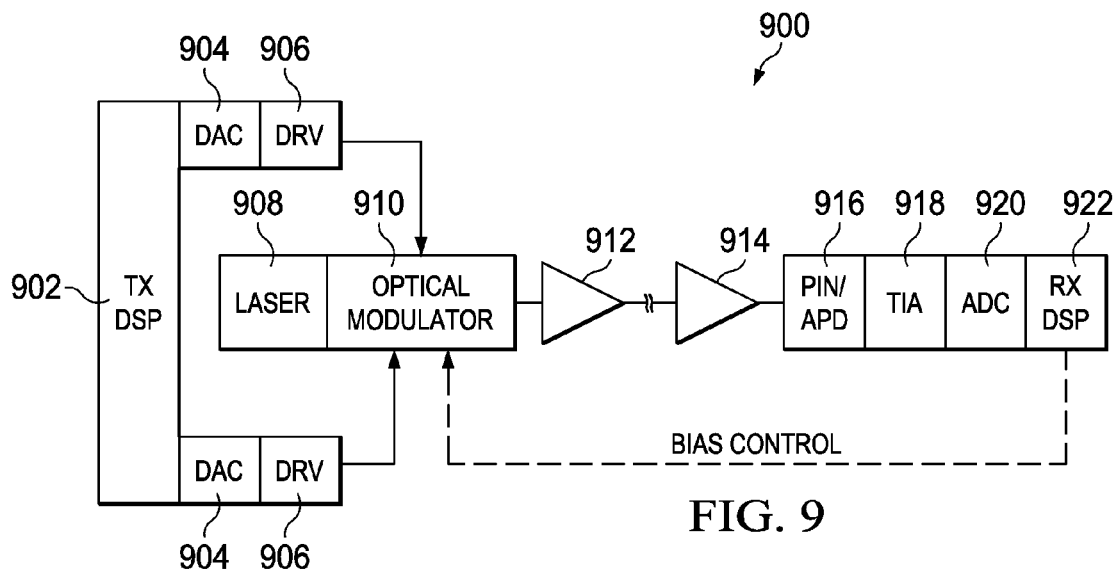
FIG. 9 is a schematic diagram of an embodiment direct detection transceiver system without an optical filter.

FIG. 9 is a schematic diagram of an embodiment direct detection transceiver system 900 without an optical filter. System 900 includes a TX DSP 902, a plurality of DACs 904, a plurality of DRVs 906, a laser 908, an optical modulator 910, a TX optical amplifier 912, a RX optical amplifier 914, a photo detector (e.g., PIN/APD) 916, a TIA 918, an ADC 920, and an RX DSP 922. The components of system 900 may be arranged as shown in FIG. 9. The RX DSP 922 estimates a CSPR from the detected optical signal and generates a bias control signal that is transmitted back to the optical modulator 910 to control the CW of the laser 908.

Figure 10:
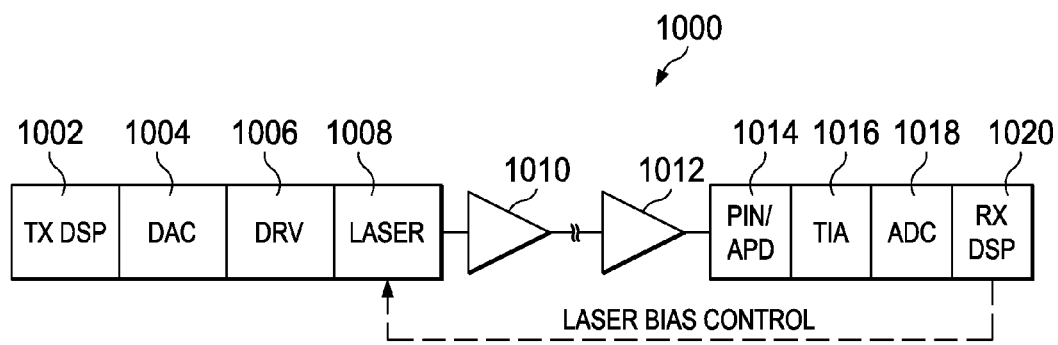
FIG. 10 is a schematic diagram of an embodiment direct detection transceiver system without an optical filter.

FIG. 10 is a schematic diagram of an embodiment direct detection transceiver system 1000 without an optical filter. System 1000 includes a TX DSP 1002, a DAC 1004, a DRV 1006, a laser 1008, a TX optical amplifier 1010, a RX optical amplifier 1012, a photo detector (e.g., PIN/APD) 1014, a TIA 1016, an ADC 1018, and an RX DSP 1020. The components of system 1000 may be arranged as shown in FIG. 10. The RX DSP 1020 estimates a CSPR from the detected optical signal and generates a bias control signal that is transmitted back to the laser 1008 to control the CW of the laser 1008.

Figure 11:
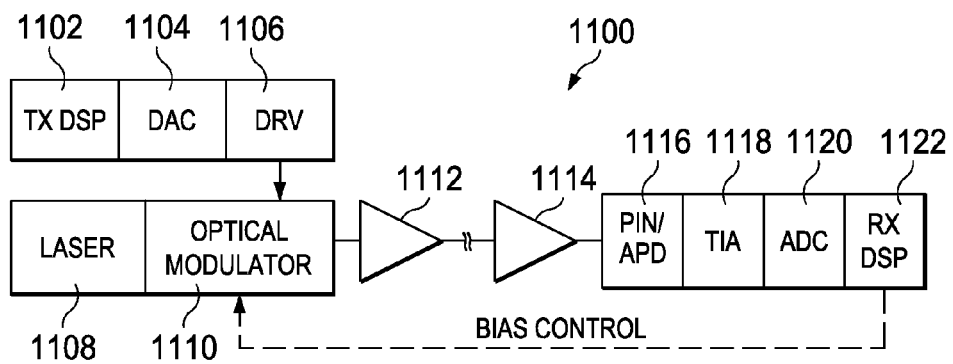
FIG. 11 is a schematic diagram of an embodiment direct detection transceiver system without an optical filter.

FIG. 11 is a schematic diagram of an embodiment of a direct detection transceiver system 1100 without an optical filter. System 1100 includes a TX DSP 1102, a DAC 1104, a DRV 1106, a laser 1108, an optical modulator 1110, a TX optical amplifier 1112, a RX optical amplifier 1114, a photo detector (e.g., PIN/APD) 1116, a TIA 1118, an ADC 1120, and an RX DSP 1122. The components of system 1100 may be arranged as shown in FIG. 11. The RX DSP 1122 estimates a CSPR from the detected optical signal and generates a bias control signal that is transmitted back to the optical modulator 1110 to control the CW of the laser 1108.

FIGS. 9, 10, and 11 show three general types of direct detection transceiver without optical filter, where the CSPR estimation and control method proposed in this disclosure can also be used. In these cases, CSPR is often set up via the dc bias voltage for the laser and/or the modulator. In an embodiment, this can also be readily extended to WDM systems such as those in FIGS. 5-7.

Operation for CSPR Control

In an embodiment, one element to SSB filter control is to obtain an accurate CSPR estimation without interrupting data traffic. In an embodiment, a disclosed method relies on RX DSP, and the method does not require additional hardware or analog components. Also CSPR estimation can be done seamlessly as part of demodulation process.

Figure 12:
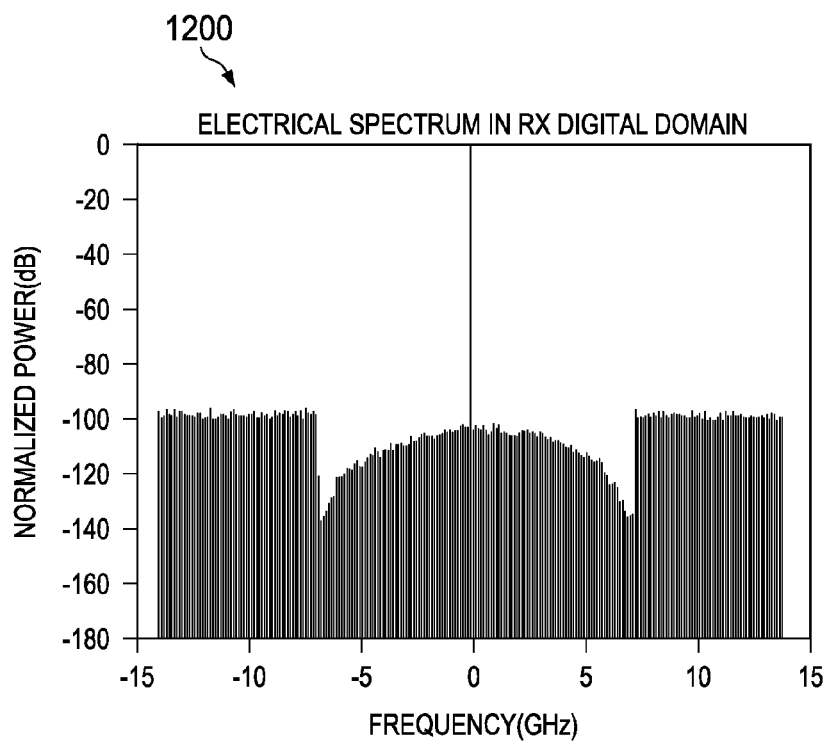
FIG. 12 is a graph that shows the signal spectrum typically seen at the RX.
Figure 13:
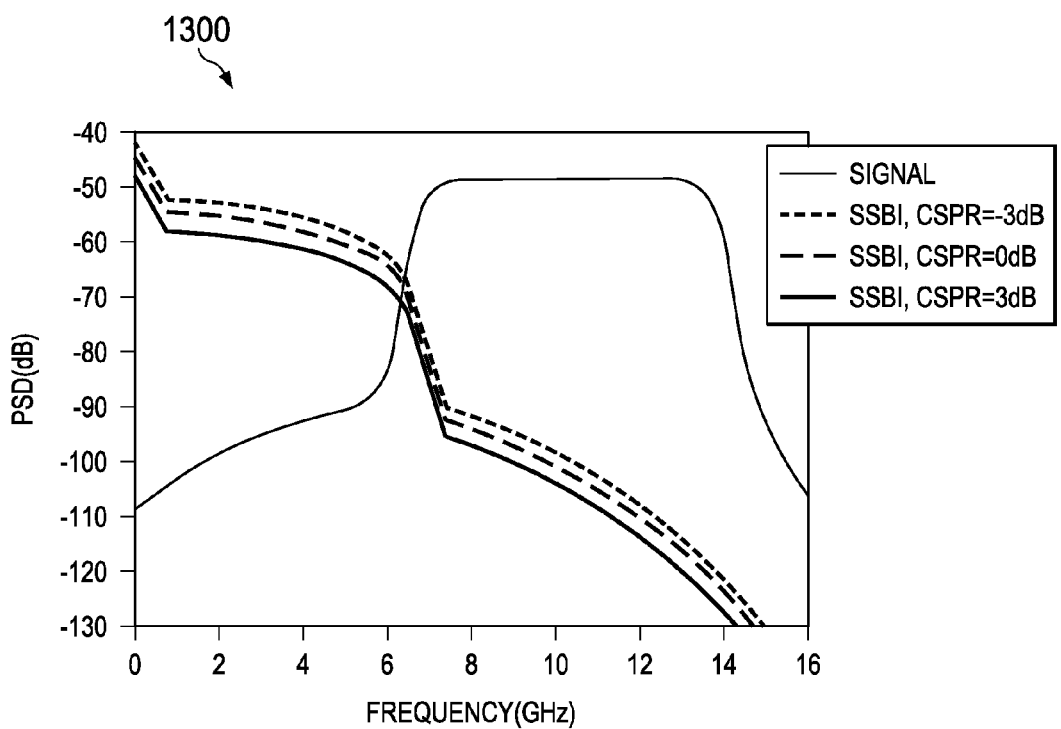
FIG. 13 is a graph that plots the power spectral density (PSD) for the signal and SSBI at RX separately.

FIG. 12 is a graph 1200 that shows a signal spectrum typically seen at the RX. In addition to the OFDM signal between 7-14 GHz, new frequency content appears in the gap after direct detection due to signal-signal beat interference (SSBI). For a better illustration, FIG. 13 is a graph 1300 that plots the power spectral density (PSD) for the signal and SSBI at RX separately. Two observations can be made here. First, the signal and SSBI reside in different frequency band, so they can be extracted using DSP. Second, SSBI power increases as CSPR reduces, which provides the basis for CSPR control. Mathematically, RX electrical signal is proportional to photocurrent, $$V(t) = (A + m(t))^2 = A^2 + 2ARe(m(t) + m(t)^*) + |m(t)|^2 = \text{dc} + \text{signal} + SSBI$$

where A is dc voltage, m(t) is the OFDM signal, ( )* is complex conjugate. The CSPR is defined as $20 \log_{10}(A/\text{rms}(m(t)))$ in dB unit. The dc term is usually rejected due to ac-coupling. It is found that the CSPR can be approximated by the ratio of signal power and power residing in the gap, $$CSPR' = 10\log_{10}\left(\frac{Psignal}{2PSSBI}\right) \cong 10\log_{10}\left(\frac{Psignal}{2Pgap}\right)$$

In the digital domain, the estimate CSPR is calculated using digital samples in the QAM demodulator, where data subcarriers are located from subcarrier $N_1$ to $N_2$, and the gap subcarriers are from 1 to $N_1-1$.

$$CSPR' = 10\log_{10}\left(\frac{\sum_{n=N_1}^{N_2}|dn|^2}{2\sum_{n=1}^{N_1}|dn|^2}\right)$$

where $N_{avg}$ is the number of symbols under averaging, n is subcarrier index, N1 is the number of subcarriers in the gap, N2 is the total number of subcarriers in the gap and the data sections. In addition, the sliced signal symbols can also be used for CSPR estimation and averaging across multiple OFDM frames in order to reduce optical noise impact, $$CSPR' = \frac{1}{N_{avg}} \sum_{N_{avg}} 10\log_{10}\left(\frac{\sum_{n=N1}^{N2}|\hat{d}n|^2}{2\sum_{n=1}^{N1}|\hat{d}n|^2}\right)$$

where dn is training data on n-th subcarrier, and d̂n is data on n-th subcarrier after decision. In an embodiment, it may be necessary to make a tradeoff between estimation accuracy and tracking speed. For example, in a 10 GBaud and FFT=1024 system, CSPR can be tracked in the frequency of 10 GHz/1024~=10 MHz if averaging is not applied. If an average across 10 OFDM frames is obtained, a change on the order of 1 MHz can still be tracked. This should be sufficient for the CSPR change due to analog components, such as laser frequency wandering and/or temperature change.

Figure 14:
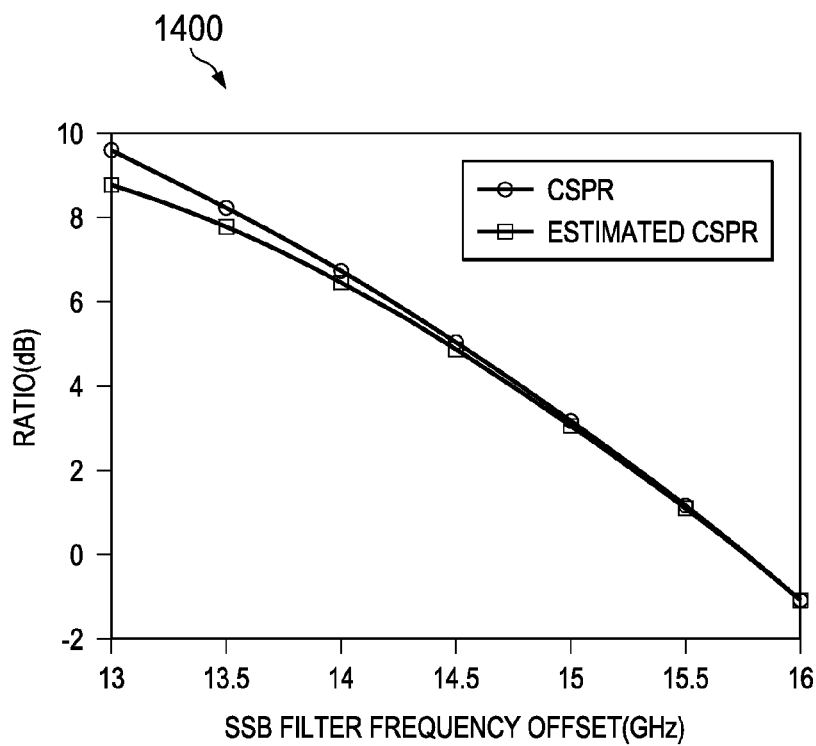
FIG. 14 is a graph that shows a simulation example of CSPR tracking.

FIG. 14 is a graph 1400 that shows a simulation example of CSPR tracking. As the SSB filter frequency offset is increased, the filter is moved to the higher positive frequency, and CSPR will reduce since more dc power is suppressed CSPR. It can be seen that the estimate CSPR can track the actual one very closely. The deviation at large CSPR is due to increased noise interference, thus reduce estimation accuracy. Since CSPR will be controlled ~0 dB during normal operation, the deviation is not a big issue. A simple lookup table will suffice for calibration purpose.

Figure 15:
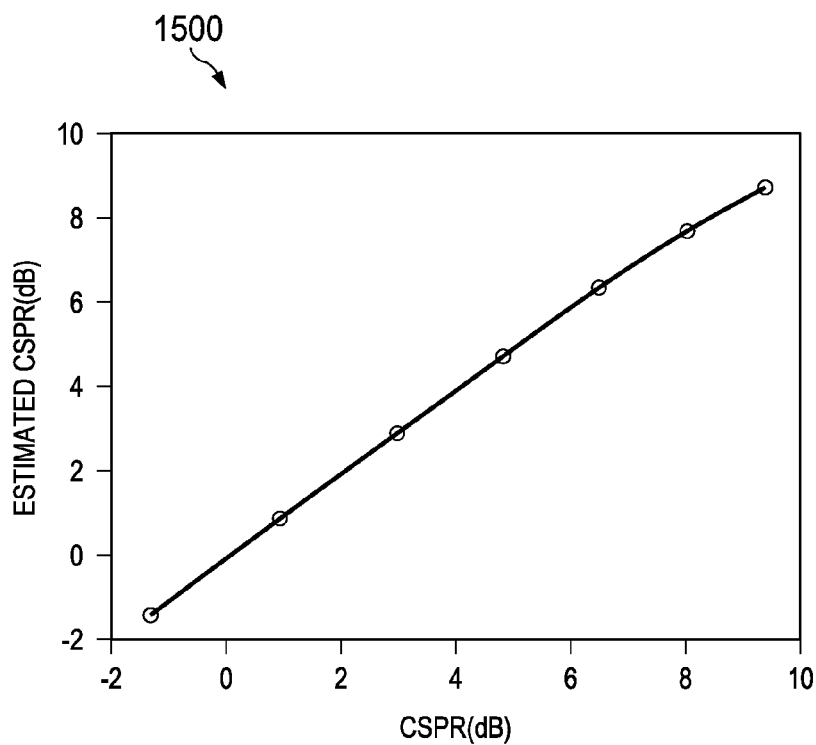
FIG. 15 is a graph of estimated CSPR versus actual CSPR that shows a good linear relationship between the estimate and actual CSPR.

In addition, FIG. 15 is a graph 1500 of estimated CSPR versus actual CSPR that shows a good linear relationship between the estimate and actual CSPR. This implies that the estimate CSPR can be used as an excellent control signal for SSB filter.

Furthermore, when laser tones are frequency locked in WDM transmission, average the estimate CSPR across multiple WDM channels can be averaged, and convert this into a single tuning voltage for SSB filter. This will be useful for certain SSB filter design such as etalon cavity, where SSB filters for different channels are tuned together via a single tuning voltage.

$$CSPR'_{avg} =$$

$$\frac{1}{N_{channel}N_{avg}} \sum_{N_{channel}} \sum_{N_{avg}} 10\log_{10}\left(\frac{\sum_{n=N1}^{N2}|\hat{d}n|^2}{2\sum_{n=1}^{N1}|\hat{d}n|^2}\right) = \frac{1}{N_{channel}} \sum_{N_{channel}} CSPR'_i$$

where $CSPR_{avg}$ is the average CSPR, $N_{channel}$ is the total number of channels, and $CSPR_i$ is an estimated CSPR for the $i^{th}$ channel.

In the following section two issues are addressed that may potentially degrade the estimation accuracy and thus the control curve sensitivity. First the impact of optical noise is considered.

Figure 16:
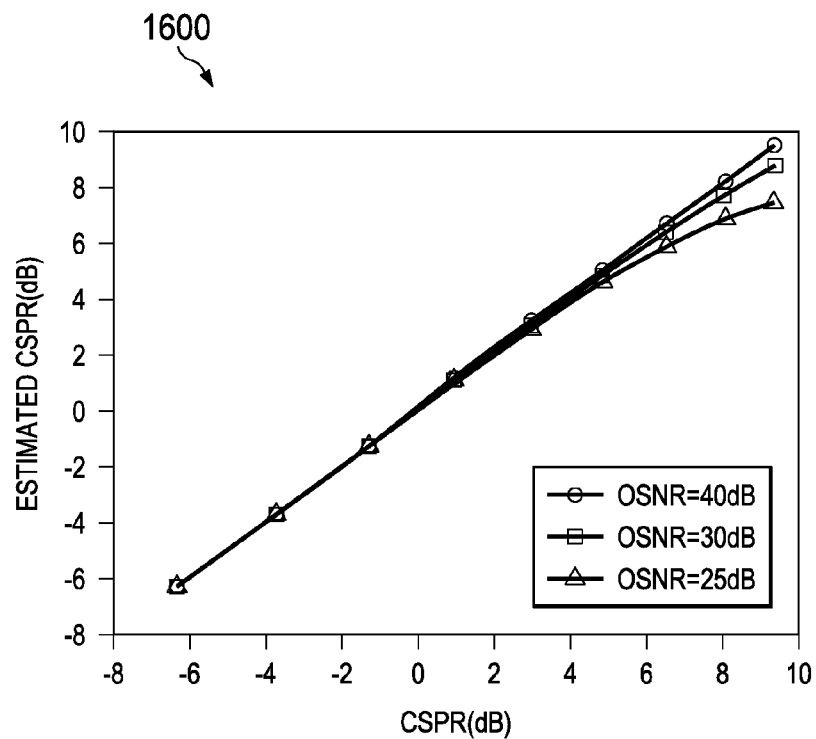
FIG. 16 is a graph of the estimate CSPR under different OSNRs.

FIG. 16 is a graph 1600 of the estimate CSPR under different OSNRs. The estimate CSPR deviates from the actual curve when OSNR is decreased. However, the control curves are very linear for smaller CSPR, which are used for normal operation. Note that ROSNR=28 dB @BER=1e-3 for the simulated system.

Figure 17:
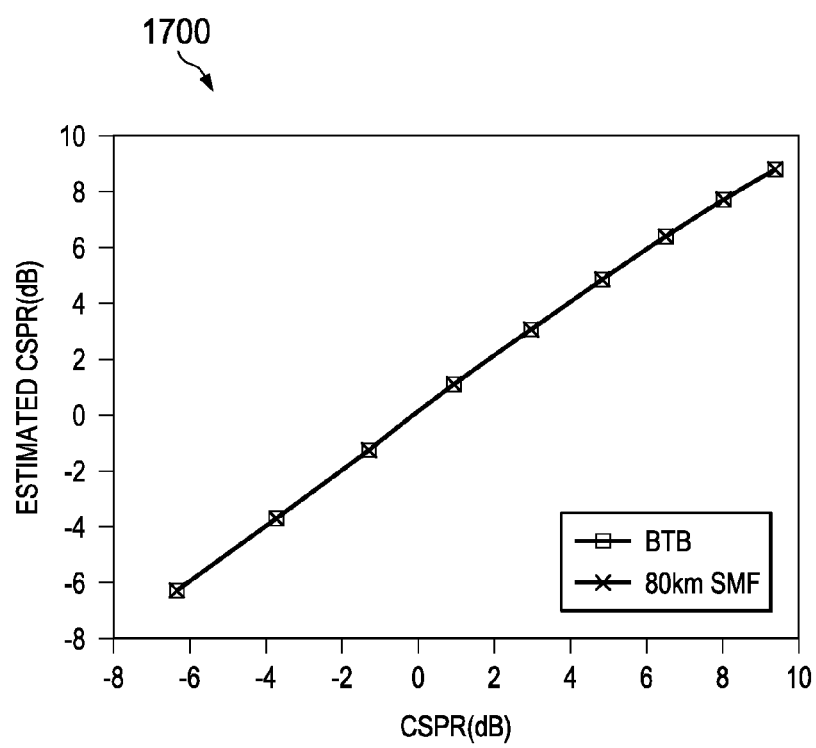
FIG. 17 is a graph that shows no impact from transmission should be expected if OSNR is held the same at RX.

Second, the estimation accuracy after fiber transmission is considered. FIG. 17 is a graph 1700 that shows no impact from transmission should be expected if OSNR is held the same at RX. However, fiber PMD and nonlinear effects are not included in the present simulation. However, it is not expected that they will impact performance significantly.

Closed Loop Performance

Figure 18:
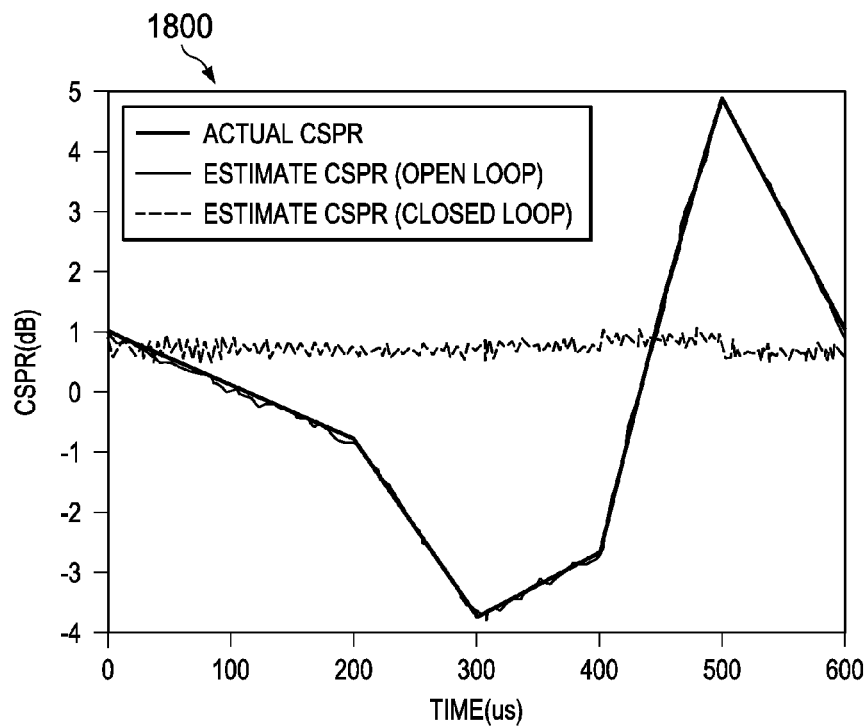
FIG. 18 is a graph of CSPR versus time for actual CSPR, CSPR estimated using an open loop system, and CSPR using a closed loop system.
Figure 19:
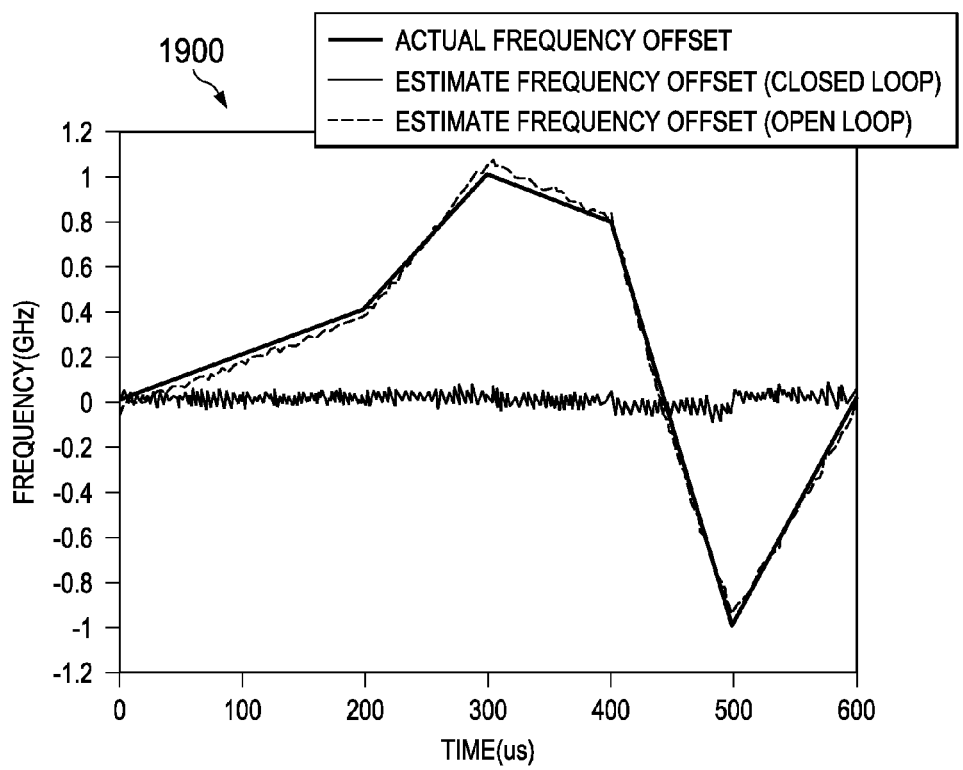
FIG. 19 is a graph of frequency versus time showing actual frequency offset, estimated frequency offset using a closed loop system, and estimated frequency offset using an open loop system.
Figure 20:
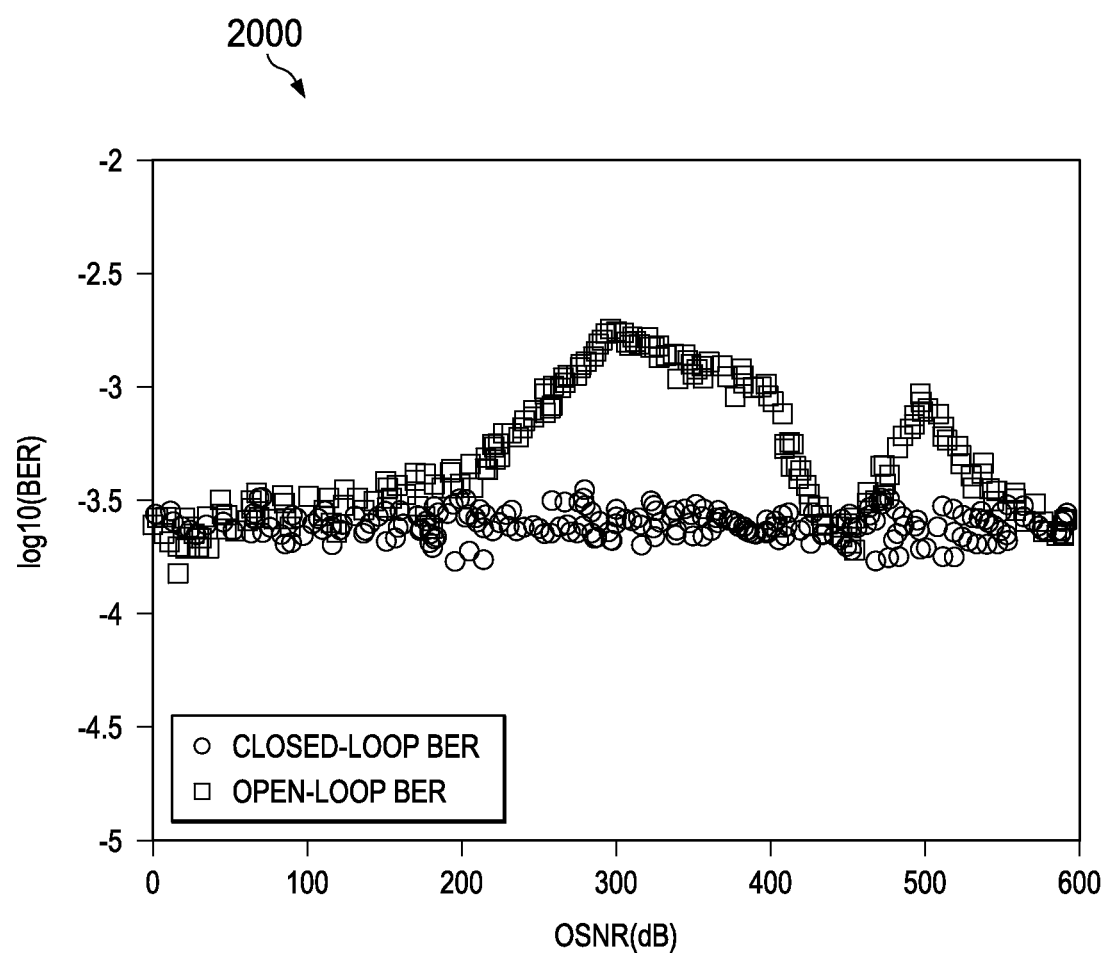
FIG. 20 is a graph of the log of the BER versus OSNR for closed-loop BER and open-loop BER.

In this section, the closed-loop performance of the proposed control method is evaluated in simulation. Each channel carries a 40.2-Gigabits/second (Gb/s) OFDM signal using 64-quadrature amplitude modulation (QAM) modulation format. The signal bandwidth is 7 Gigahertz (GHz). When a control loop in used, both CSPR and frequency offset are controlled to a steady value, even though a free-running frequency offset ramp may be present. FIG. 18 is a graph 1800 of CSPR versus time for actual CSPR, CSPR estimated using an open loop system, and CSPR using a closed loop system. FIG. 19 is a graph 1900 of frequency versus time showing actual frequency offset, estimated frequency offset using a closed loop system, and estimated frequency offset using an open loop system. FIG. 20 is a graph 2000 of the log of the BER versus OSNR for closed-loop BER and open-loop BER.

The following reference is related to subject matter of the present application. This reference is incorporated herein by reference in its entirety:

[1] U.S. Pat. No. 8,233,799 entitled "Method and Apparatus for Improving Reception of Optical Signals.

Figure 21:
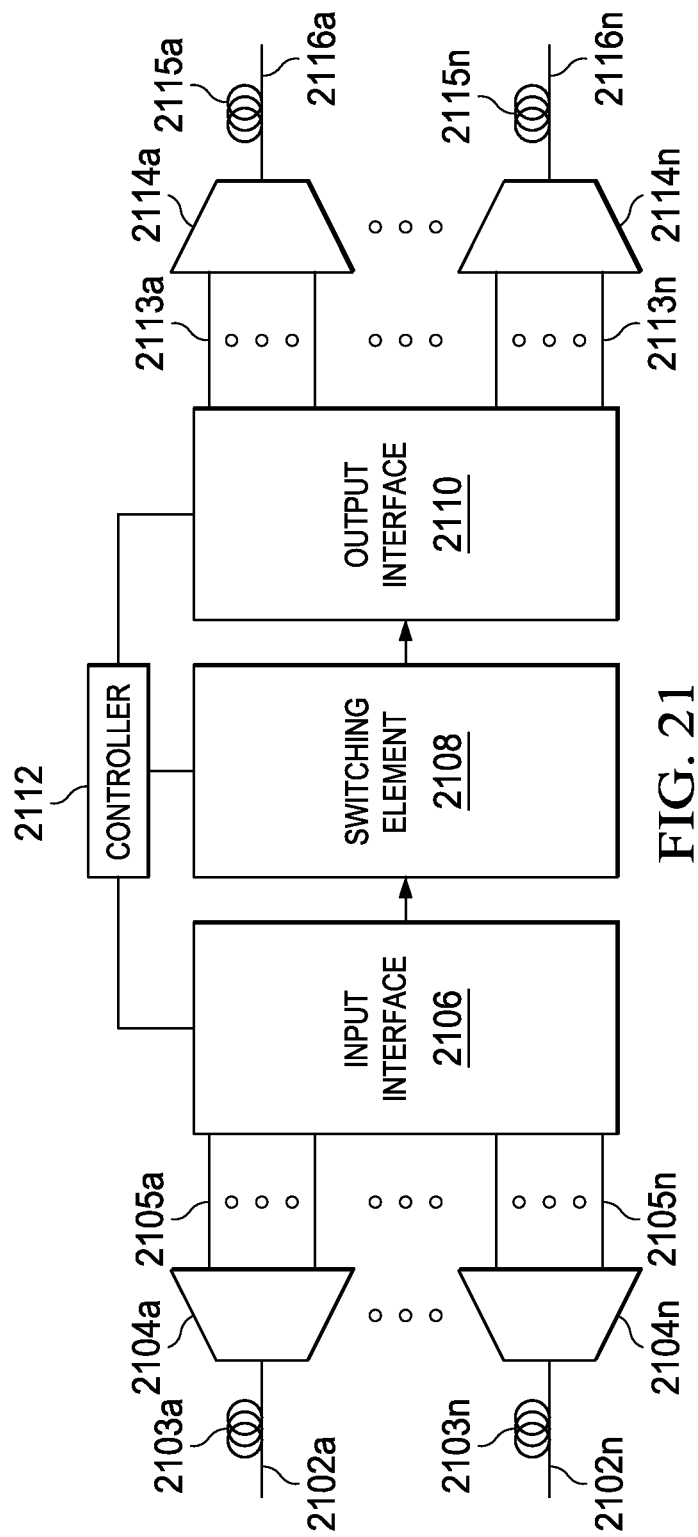
FIG. 21 is a block diagram of an embodiment optical data router.

FIG. 21 is a block diagram of an embodiment optical data router 2100. Optical data router 2100 may be used for implementing the devices and methods disclosed herein. Specific devices may utilize all of the components shown, or only a subset of the components and levels of integration may vary from device to device. Furthermore, a device may contain multiple instances of a component. Router 2100 includes one or more separators 2104, an input interface 2106, a switching element 2108, an output interface 2110, a controller 2112, and one or more combiners 2114. Each separator 2104 is configured to separate an input optical signal 2103 communicated over a communication link 2102. Separator 2104 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 2106, switching element 2108, and/or output interface 2110 include a PIC that incorporates the disclosed thermo-optic switches with thermally isolated and heat restricting pillars.

Communication link 2102 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 2102 is configured to couple router 2100 to other optical and/or electro-optical components. For example, link 2102 could couple router 2100 to a cross-connect or another device operable to terminate, switch, route, process, and/or provide access to and/or from communication link 2102 and another communication link or communication device. As used throughout this document, the term "couple" and/or "coupled" refers to any direct or indirect communication between two or more elements, whether or not those elements are physically connected to one another. In some embodiments, communication link 2102 can comprise a point-to-point communication link or a portion of a larger communication network, such as a ring network, a mesh network, a star network, or other network configuration.

Optical signal 2103 may include a multiple wavelength optical signal. For example, optical signal 2103 can include at least 5 wavelength channels, at least 100 wavelength channels, or at least 250 wavelength channels. In one particular embodiment, optical signal 2103 includes 250 wavelengths having a 50 gigahertz (GHz) spacing within a 100 nanometer (nm) spectral window. In that example, the 100 nm spectral window can be located within the 1400 nm to 1650 nm low-loss window associated with optical fibers. In various embodiments, optical signal 2103 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 2104 is configured or operates to separate optical signal 2103 into individual wavelength channels 2105 and to couple each wavelength channel 2105 to an input interface 2106. In an alternative embodiment, separator 2104 can separate optical signal 2103 into separate multiple-wavelength channels and couple those multiple-wavelength channels to input interface 2106. Wavelength channels 2105 can comprise, for example, Internet Protocol (IP) packets, voice data, video data, or any other data type and/or data format. In this particular embodiment, each wavelength channel 2105 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 2105, however this format is not required. In this example, each wavelength channel 2105 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 2106 is configured to receive and process each wavelength channel 2105 associated with optical signal 2103. Input interface 2106 can comprise any optical and/or electrical components—including any hardware, software, and/or firmware—capable of processing, converting, replicating, updating, and/or swapping one or more packet labels associated with each wavelength channel 2105. In various embodiments, input interface 2106 can determine a desired routing for a packet data associated with each wavelength channel 2105 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 2106 may include a controller that receives an electrical representation of a packet label and generates a control signal that functions to modulate a swapping sequence on an optical signal.

Switching element 2108 is configured to process one or more packet data associated with wavelength channels 2105 received from input interface 2106 and directing those packet data to a desired destination. Switching element 2108 can include any optical and/or electrical components—including any hardware, software, and/or firmware—capable of switching, routing, error checking, and/or managing the one or more packet data or packet labels associated with each wavelength channel 2105. In an embodiment, switching element 2108 can comprise a ring configuration having one or more core router nodes and at least one management node. Although this example implements a ring configuration, switching element 2108 could implement a mesh configuration, a star configuration, or any other configuration without departing from the scope of the present disclosure. In various embodiments, switching element 2108 can operate to process wavelength channels 2105 at processing speeds of, for example, at least 10 gigabits/second (Gb/s), at least 40 Gb/s, at least 100 Gb/s, or at least 160 Gb/s.

In an embodiment, switching element 2108 is configured to route one or more packet data associated with wavelength channels 2105 to an output interface 2110. Output interface 2110 can comprise any optical and/or electrical components including any hardware, software, and/or firmware capable of preparing one or more packet data associated with wavelength channels 2105 for communication from router 2100. In this example, output interface 2110 operates to communicate the one or more packet data from router 2100 to a desired destination through an appropriate wavelength channel 2113.

In an embodiment, each combiner 2114 is configured to combine output wavelength channels 2113 into one or more output optical signals 2115 for communication over a communication links 2116. In an embodiment, combiner 2114 includes, for example, a wavelength division multiplexer. The structure and function of communication link 2116 can be substantially similar to the structure and function of communication link 2102. In this example, communication links 2116 operate to couple router 2100 to other optical and/or electro-optical components.

In this example, the controller 2112 is also capable of at least partially contributing to controlling one or more functionalities associated with router 2100. That is, controller 2112 is not required to be capable of performing the desired functionality alone, but may contribute to the performance of the function as part of a larger routine. Controller 2112 can comprise any communication and/or computational device or devices, including any hardware, software, firmware, or combination thereof. In an embodiment, controller 2112 includes a processor 2117, a memory 2118, and storage device 2119. The processor 2117 is configured to execute instructions stored in memory 2118. Memory 2118 may be a random access memory (RAM) such as a dynamic RAM (DRAM). Data may be stored in storage device 2119 for long term storage. Storage device 2119 may be a hard disk drive, an optical disk, or other data storage solution.

In an embodiment, in operation, the packet data associated with wavelength channels 2105 are transparent to the processing functions of router 2100. That is, in operation router 2100 does not examine the content of the packet data associated with each wavelength channel 2105. In some cases, router 2100 does examine the contents of one or more packet labels and/or other elements of a frame format associated with wavelength channels 2105. In most cases, router 2100 operates to maintain the packet data associated with wavelength channels 2105 in the optical domain. That is, the packet data associated with each wavelength channel 2105 are not subjected to an optical-to-electrical conversion by router 2100. In some cases, one or more of the packet labels and/or other elements of a frame format associated with wavelength channels 2105 can be subjected to one or more optical-to-electrical and/or electrical-to-optical conversions. In various embodiments, router 2100 may be capable of an aggregate capacity of, for example, at least 5 terabits/second (Tb/s), at least 25 Tb/s, at least 50 Tb/s, or at least 100 Tb/s.

In an embodiment, router 2100 can operate to minimize and/or avoid contention between packet data associated with optical signals 2103 and 2115 and/or wavelength channels 2105 and 2113 within switching element 2108 and/or communication links 2102 and 2116. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for carrier-signal power ratio (CSPR) control in a direct detection optical system, comprising:
    receiving an electrical signal in a receiver (RX) digital signal processor (DSP) wherein the electrical signal is obtained from a corresponding optical signal via a direct detection component;
    estimating, with the RX DSP, a CSPR for the electrical signal, wherein the estimating the CSPR comprises estimating the CSPR in a digital domain according to digital samples in a quadrature amplitude modulation (QAM) demodulator;
    generating, with the RX DSP, a control signal according to the CSPR; and
    transmitting, with the RX DSP, the control signal to a first optical element, wherein the control signal causes a center wavelength (CW) of the first optical element to be adjusted such that an offset between the CW of the first optical element and the CW of a second optical element results in a specified CSPR.

2. The method of claim 1, wherein the first optical element comprises one of an optical filter and a laser and wherein the second optical element comprises the other one of the optical filter and the laser.

3. The method of claim 1, wherein data traffic through the system is uninterrupted.

4. The method of claim 1, wherein estimating the CSPR comprises determining a ratio of signal power and a signal due to signal-signal beat interference (SSBI).

5. The method of claim 1, wherein estimating the CSPR comprises determining an estimated CSPR, wherein the estimated CSPR comprises a CSPR', and wherein the CSPR' is determined according to:

$$CSPR' = 10\log_{10}\left(\frac{\sum_{n=N1}^{N2} |dn|^2}{2\sum_{n=1}^{N1} |dn|^2}\right)$$

where, n is subcarrier index, dn is training data on an n-th subcarrier, N1 is a number of subcarrier in a gap, and N2 is a total number of subcarriers in gap and data sections.

6. The method of claim 1, wherein estimating the CSPR comprises determining an estimated CSPR, wherein the estimated CSPR comprises a CSPR', and wherein the CSPR' is determined according to:

$$CSPR' = \frac{1}{N_{avg}}\sum_{N_{avg}} 10\log_{10}\left(\frac{\sum_{n=N1}^{N2} |\hat{d}n|^2}{2\sum_{n=1}^{N1} |\hat{d}n|^2}\right)$$

where $N_{avg}$ is a number of symbols under averaging, N1 is a number of subcarrier in a gap, N2 is a total number of subcarriers in gap and data sections, dn is training data on an n-th subcarrier, and $\hat{d}n$ is data on an n-th subcarrier.

7. The method of claim 1, wherein generating the control signal comprises averaging the estimated CSPR across multiple WDM channels and converting the average estimated CSPR into a single tuning voltage for a single-side band (SSB) filter.

8. The method of claim 7, wherein the average CSPR is determined according to:

$$CSPR_{avg} = \frac{1}{N_{channel}}\sum_{N_{channel}} CSPR_i$$

where $CSPR_{avg}$ is the average CSPR, $N_{channel}$ is the total number of channels, and $CSPR_i$ is an estimated CSPR for the $i^{th}$ channel.

9. The method of claim 1, wherein estimating the CSPR comprises receiving, at a central office receiver, an estimated CSPR from a DSP in a client side transceiver via a feedback channel, wherein the DSP in the client side transceiver estimates the CSPR from a received signal received from the central office transmitter.

10. The method of claim 1, wherein estimating the CSPR comprises estimating the CSPR of a signal received by a central office receiver from a client side transmitter and using the estimated CSPR of the signal received from the client to adjust the CSPR of the central office transmitter.

11. A network component configured for carrier-signal power ratio (CSPR) control in a direct detection optical system, the network component comprising:
    a processor; and a computer readable storage medium storing programming for execution by the processor, the programming including instructions to:
receive an electrical signal, wherein the electrical signal is obtained from a corresponding optical signal via a direct detection component;
estimate a CSPR for the electrical signal;
generate a control signal according to the CSPR; and
transmit the control signal to a first optical element, wherein the control signal causes a center wavelength (CW) of the first optical element to be adjusted such that an offset between the CW of the first optical element and the CW of a second optical element results in a specified CSPR,
wherein the instructions to estimate CSPR comprise instructions to estimate the CSPR in a digital domain according to digital samples in a quadrature amplitude modulation (QAM) demodulator.

12. The network component of claim 11, wherein the first optical element comprises one of an optical filter and a laser and wherein the second optical element comprises the other one of the optical filter and the laser.

13. The network component of claim 11, wherein data traffic through the system is uninterrupted.

14. The network component of claim 11, wherein the instructions to estimate the CSPR comprise instructions to determine a ratio of signal power and a signal due to signal-signal beat interference (SSBI).

15. The network component of claim 11, wherein the instructions to estimate CSPR comprise instructions to determine an estimated CSPR, wherein the estimated CSPR comprises a CSPR', and wherein the CSPR' is determined according to:

$$CSPR' = 10\log_{10}\left(\frac{\sum_{n=N1}^{N2} |dn|^2}{2\sum_{n=1}^{N1} |dn|^2}\right)$$

where, n is subcarrier index, dn is training data on an n-th subcarrier, N1 is a number of subcarrier in a gap, and N2 is a total number of subcarriers in gap and data sections.

16. The network component of claim 11, wherein the instructions to estimate CSPR comprise instructions to determine an estimated CSPR, wherein the estimated CSPR comprises a CSPR', and wherein the CSPR' is determined according to:

$$CSPR' = \frac{1}{N_{avg}}\sum_{N_{avg}} 10\log_{10}\left(\frac{\sum_{n=N1}^{N2} |\hat{d}n|^2}{2\sum_{n=1}^{N1} |\hat{d}n|^2}\right)$$

where $N_{avg}$ is a number of symbols under averaging, N1 is a number of subcarrier in a gap, N2 is a total number of subcarriers in gap and data sections, dn is training data on an n-th subcarrier, and $\hat{d}n$ is data on an n-th subcarrier.

17. The network component of claim 11, wherein the instructions to generate the control signal comprise instructions to average the estimated CSPR across multiple WDM channels and converting the average estimated CSPR into a single tuning voltage for a SSB filter.

18. The network component of claim 17, wherein the average CSPR is determined according to:

$$CSPR_{avg} = \frac{1}{N_{channel}}\sum_{N_{channel}} CSPR_i$$

where $CSPR_{avg}$ is the average CSPR, $N_{channel}$ is the total number of channels, and $CSPR_i$ is an estimated CSPR for the $i^{th}$ channel.

19. The network component of claim 11, wherein the instructions to estimate the CSPR comprises instructions to receive, at a central office receiver, an estimated CSPR from a digital signal processor (DSP) in a client side transceiver via a feedback channel, wherein the DSP in the client side transceiver estimates the CSPR from a received signal received from the central office transmitter.

20. The network component of claim 11, wherein the instructions to estimate the CSPR comprises instructions to estimate the CSPR of a signal received by a central office receiver from a client side transmitter and using the estimated CSPR of the signal received from the client to adjust the CSPR of the central office transmitter.

21. A direct detected optical transmission system, comprising:
a laser;
an optical filter in a signal path of an optical output from the laser; and
a controller communicably coupled to at least one of the laser and the optical filter, wherein the processor is configured to estimate a carrier-signal power ratio (CSPR) in the direct detected optical transmission system, wherein the processor is further configured to generate a control signal according to the CSPR, wherein the processor is further configured to send the control signal to one of the laser and the optical filter, and wherein the control signal causes a center wavelength (CW) of one of the optical filter and the laser to be adjusted such that an offset between the CW of the optical filter and the CW of the laser results in a specified CSPR in a transmitted optical signal,
wherein estimating the CSPR comprises estimating the CSPR in a digital domain according to digital samples in a quadrature amplitude modulation (QAM) demodulator.

22. The direct detected optical transmission system of claim 21, wherein the transmitted optical signal comprises an Orthogonal Frequency-Division Multiplexing (OFDM) signal.

23. The direct detected optical transmission system of claim 21, wherein the processor comprises a digital signal processor (DSP).

24. The direct detected optical transmission system of claim 21, wherein data traffic through the direct detected optical transmission system is uninterrupted.

25. The direct detected optical transmission system of claim 21, wherein estimating the CSPR comprises determining a ratio of signal power and a signal due to signal-signal beat interference (SSBI).

26. The direct detected optical transmission system of claim 21, wherein generating the control signal comprises averaging the estimated CSPR across multiple Wavelength Division Multiplexing (WDM) channels and converting the average estimated CSPR into a single tuning voltage for a single-side band (SSB) filter.

27. The direct detected optical transmission system of claim 21, wherein bi-directional links are substantially identical, and wherein the CSPR is estimated from a signal from a client side transmitter.

28. The direct detected optical transmission system of claim 21, further comprises a receiver configured to receive an estimate of the CSPR from a client side component via a feedback channel, wherein the client component estimated the CSPR of a signal received from the laser.

* * * * *

UNITED STATES PATENT AND TRADEMARK OFFICE
CERTIFICATE OF CORRECTION

PATENT NO. : 9,608,723 B2
APPLICATION NO. : 14/518881
DATED : March 28, 2017
INVENTOR(S) : Chen et al.

It is certified that error appears in the above-identified patent and that said Letters Patent is hereby corrected as shown below:

In the Claims

In Column 14, Lines 5-13, Claim 5, delete the equation and insert $$CSPR' = 10 log_{10} \left( \frac{\sum_{n=N_1}^{N_2} |\hat{d}n|^2}{2 \sum_{n=1}^{N_1-1} |\hat{d}n|^2} \right)$$

In Column 14, Lines 22-30, Claim 6, delete the equation and insert $$CSPR' = \frac{1}{N_{avg}} \sum_{N_{avg}} 10 log_{10} \left( \frac{\sum_{n=N_1}^{N_2} |\hat{d}n|^2}{2 \sum_{n=1}^{N_1-1} |\hat{d}n|^2} \right)$$

In Column 15, Lines 35-42, Claim 15, delete the equation and insert $$CSPR' = 10 log_{10} \left( \frac{\sum_{n=N_1}^{N_2} |\hat{d}n|^2}{2 \sum_{n=1}^{N_1-1} |\hat{d}n|^2} \right)$$

In Column 15, Lines 52-60, Claim 16, delete the equation and insert $$CSPR' = \frac{1}{N_{avg}} \sum_{N_{avg}} 10 log_{10} \left( \frac{\sum_{n=N_1}^{N_2} |\hat{d}n|^2}{2 \sum_{n=1}^{N_1-1} |\hat{d}n|^2} \right)$$

Signed and Sealed this
Twelfth Day of September, 2017

Joseph Matal
*Performing the Functions and Duties of the
Under Secretary of Commerce for Intellectual Property and
Director of the United States Patent and Trademark Office*